United States Patent [19]

Del Tufo et al.

[11] Patent Number: 4,498,802
[45] Date of Patent: Feb. 12, 1985

[54] COUPLING ARRANGEMENT

[75] Inventors: Mark J. Del Tufo, Basking Ridge; Ralph J. Lake, Jr., Somerville; Stephen R. Solomon, Cranford, all of N.J.

[73] Assignee: Burroughs Corporation, Detroit, Mich.

[21] Appl. No.: 537,264

[22] Filed: Sep. 29, 1983

[51] Int. Cl.³ .............................................. F16B 1/00
[52] U.S. Cl. ................................. 403/300; 403/405; 52/667
[58] Field of Search ............... 403/405, 300, 301, 292, 403/402, 401, 298, 406; 52/726, 667

[56] References Cited

U.S. PATENT DOCUMENTS

| 221,109 | 10/1879 | Seiler | 403/406 |
| 2,304,126 | 12/1942 | Skeel | 403/406 |
| 3,284,977 | 11/1966 | Lickliter et al. | 52/726 |
| 3,288,489 | 11/1966 | John | 52/726 X |
| 3,855,754 | 12/1974 | Scoville | 403/406 X |
| 4,335,973 | 6/1982 | Beck | 403/300 |

FOREIGN PATENT DOCUMENTS 1044840 10/1966 United Kingdom ................ 403/292

Primary Examiner—Andrew V. Kundrat
Attorney, Agent, or Firm—Kevin R. Peterson; Edmund M. Chung; Robert A. Green

[57] ABSTRACT

Coupling apparatus comprising two plates to be coupled together, with each plate carrying a locking mechanism for receiving a coupling member, the coupling member having two ends, each end being adapted to engage and couple to the locking mechanism on one of the plates whereby the two plates can be rigidly coupled together. Each plate carries two flexible locking tabs which are offset from each other, and the coupling member carries two holes which are offset from each other and each of which is adapted to receive one locking tab of each plate.

7 Claims, 2 Drawing Figures

COUPLING ARRANGEMENT

BACKGROUND OF THE INVENTION

This invention relates to means for coupling together two devices such as a keyboard and a keypad. At the present time, one type of electronic word processing equipment includes a main keyboard and an auxiliary keypad which are mechanically coupled together to form a unitary structure.

One such coupling arrangement is described and claimed in copending application Ser. No. 437,969, filed Nov. 1, 1982, by Ralph J. Lake, Jr., et al. This operates generally satisfactorily except that, under some circumstances, it is difficult to decouple the coupling member and the keypad. This is especially so when the coupling member is secured to a keypad for shipment to a user.

The present invention provides an improved coupling arrangement which overcomes the aforementioned problem.

DESCRIPTION OF THE INVENTION

Figure 1:
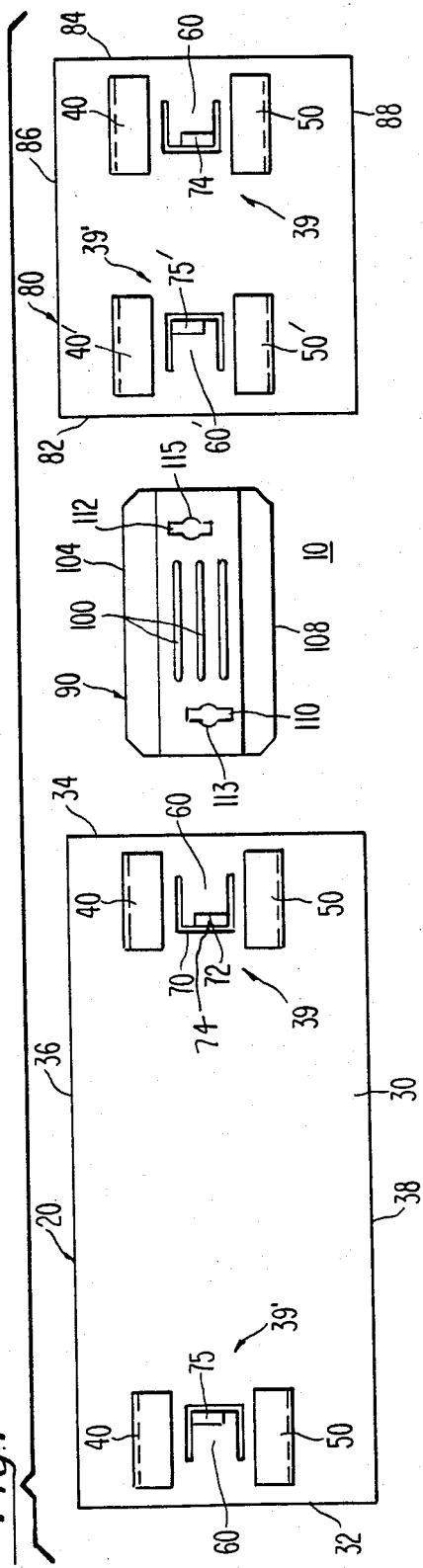
FIG. 1 is an exploded plan view of apparatus embodying the invention as seen from the lower surface thereof.

The assembly of the invention 10 includes a relatively large-area molded plastic base 20 which is intended to support a keyboard. The base 20, looking at the lower surface 30 in FIG. 1, has a left edge 32 and a right edge 34, an upper edge 36 and a lower edge 38. Formed integrally in the base, adjacent to the right hand edge of the base, is an assembly 39 made up of upper and lower integrally molded plastic strips 40 and 50 which are oriented longitudinally and spaced apart a small distance from each other and spaced from the lower surface of the base. A spring-like tab 60 is formed from the base itself by means of a generally U-shaped opening 70 formed in the base and defining the tab. The tab 60 has a certain flexibility with respect to the base and acts like a spring and can be depressed with a tool, a finger, or the like. The end 72 of the tab 60 includes at its end adjacent to the opening 70, a narrow raised locking tab or strip 74, which extends from the lower edge of tab 60 to slightly above the center of the tab.

A second assembly 39', similar to the first assembly 39 and carrying the same reference numerals primed for the same parts, is provided adjacent to the left hand edge of the base, including the spaced-apart strips 40' and 50' and flexible spring-like tab 60' having a narrow raised locking strip 75' which is different from tab 74 in that it extends from the upper edge of its tab 60' to slightly below the center of the tab.

The assembly of the invention also includes a second molded plastic base 80 which is intended to be coupled to the first base 20 and is intended to support a keypad. The base 80 includes a left edge 82, a right edge 84, an upper edge 86, and a lower edge 88, and it is also provided with left and right assemblies 39' and 39 of the type described with respect to keyboard base 20. The left hand assembly 39', adjacent to left edge 82, has locking tab 75', and the right hand assembly 39, adjacent to right edge 84, has locking tab 74.

It is noted that both assemblies 39 are adjacent to the right edges of their bases and both assemblies 39' are adjacent to the left edges of their bases.

A coupling member 90 for coupling together the two bases 20 and 80 comprises a relatively rigid metal plate having longitudinal ribs 100 extending along the central portion of the plate. Ribs 100 operate as stiffeners. The plate 90 also includes upper and lower marginal portions 104 and 108 of such a thickness that they can be slipped into place under the spaced-apart strips 40 and 50 of an assembly 39. The metal plate has two transverse slots or openings 110 and 112, one near each end thereof.

The slots 110 and 112 are not symmetrical about the longitudinal axis or center line of plate 90, but are offset therefrom. Slot 110 extends from just above the center line of the plate toward the lower edge 108, and slot 112 extends from just below the center line of the plate toward the upper edge 104. The slots 110 and 112 also include enlarged circular areas 113 and 115, located at about the center line of the plate, which serve as finger holes.

The slots 110 and 112 are of such size and shape that slot 110 can receive a locking tab 74 and slot 112 can receive a locking tab 75.

Figure 2:
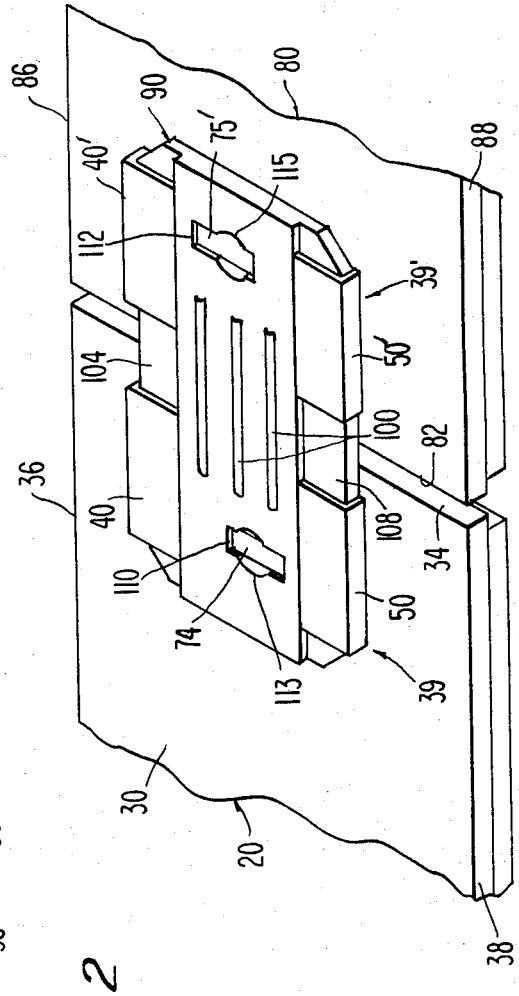
FIG. 2 is a perspective view of portions of the apparatus of FIG. 1 shown assembled.

In using the apparatus of the invention, it is customary to store the plate 90 under the keypad 80 coupled together as a unit. To this end, considering FIG. 1, the plate 90 is pushed to the right between strips 40' and 50' and the body of the keypad base 80, and, with the finger inserted in the opening 115, the locking tab 75' is prevented from locking in slot 112 as the plate moves to the right. When the plate 90 is fully inserted, neither tab 74 nor 75' enters slot 110 or 112 because of the offsets of the tabs and the slots, and the plate 90 is held in place by frictional engagement with the strips 40' and 50'. Thus, when a user receives this assembly and desires to assemble the keyboard and the keypad, he can easily remove the plate 90 from the keypad base 80 in the same way that the two were coupled together, and now the left hand end of plate 90 can be coupled to the right hand assembly 39, with tab 74 engaging slot 110, and the right hand end of plate 90 of the keypad assembly can engage the left hand assembly 39' of the keypad, with tab 75' engaging slot 112, as shown in FIG. 2.

What is claimed is:

1. Coupling apparatus comprising
   first and second members to be coupled together,
   each member carrying first means for receiving a coupling member and second means for providing locking engagement with a coupling member, and
   a coupling member having two ends, each end being adapted to engage and couple to one of said first means whereby said first and second members can be rigidly coupled together,
   said first and second members and said coupling member having longitudinal axes which are all aligned when said first and second members and said coupling member are coupled together,
   said coupling member comprising a relatively rigid metal plate having two openings positioned transverse to said axis to receive portions of each of said two members to provide locking engagement therewith, one opening lying primarily on one side of the longitudinal axis of said plate and the other opening lying primarily on the other side of the longitudinal axis of said plate, one opening in said coupling member being adapted to receive a second means of said first member, and the other opening in said coupling member being adapted to receive a second means of said second member.

2. The apparatus defined in claim 1 wherein said first and second members include means comprising spaced-apart strips which are spaced from each other and from the surface of the member, each end of said coupling member being adapted to enter the space between each strip and said member to be held thereby.

3. The apparatus defined, in claim 1 wherein each said first and second member includes two second means comprising narrow rectangular strips and said openings in said coupling member are generally rectangular and adapted to receive one said strip.

4. The apparatus defined in claim 3 wherein said openings in said coupling member also include a portion to receive a finger whereby a strip which is in an opening and engaging said coupling member can be depressed and removed from the opening.

5. Coupling apparatus comprising
  first and second members to be coupled together by a coupling plate, said first and second members and said coupling plate having aligned longitudinal axes,
  said first member having a first flexible locking tab disposed transverse to the longitudinal axis of said first member and disposed primarily on one side of the longitudinal axis of said first member, and a second flexible locking tab disposed transverse to the longitudinal axis of said first member and disposed primarily on the other side of the longitudinal axis of said first member,
  said second member having a first flexible locking tab disposed transverse to the longitudinal axis of said second member and disposed primarily on one side of the longitudinal axis of said first member, and a second flexible locking tab disposed transverse to the longitudinal axis of said second member and disposed primarily on the other side of the longitudinal axis of said second member,
  said members being so constructed that, when said first and second members are aligned with their longitudinal axes aligned, a first locking tab of said first member is adjacent to a second locking tab of said second member, and
  a coupling member having two ends, each end being adapted to engage and couple to a locking tab on said first member and a locking tab on said second member whereby said two members can be rigidly coupled together,
  said coupling member comprising a relatively rigid metal plate having a longitudinal axis and two openings positioned transverse to said axis to receive portions of each of said two members to provide locking engagement therewith, one opening lying primarily on one side of the longitudinal axis of said plate and the other opening lying primarily on the other side of the longitudinal axis of said plate, said one opening being adapted to receive a first locking tab and said other opening being adapted to receive a second locking tab.

6. The apparatus defined in claim 5 wherein
  said first and second members include means comprising spaced-apart strips which are spaced from each other and from the surface of the member, each end of said coupling member being adapted to enter the space between each strip and said member to be held thereby, and
  said locking tabs are generally narrow rectangular strips and said openings in said coupling member are generally rectangular and each is adapted to receive one locking tab.

7. The apparatus defined in claim 6 wherein said openings in said coupling member also include an enlarged portion to receive a finger whereby a strip which is in an opening and engaging said coupling member can be depressed and removed from the opening.

* * * * *